United States Patent [19]

Kuzuoka et al.

[11] 4,421,599

[45] Dec. 20, 1983

[54] FIBROUS MATERIALS

[75] Inventors: Shinichi Kuzuoka, Yokohama; Yoshinori Tachibana, Kawagoe; Goro Saito, Saitama; Nobuyuki Kitajima, Hino, all of Japan

[73] Assignee: Toppan Printing Co., Ltd., Japan

[21] Appl. No.: 326,055

[22] Filed: Nov. 30, 1981

[30] Foreign Application Priority Data

Aug. 24, 1981 [JP] Japan ................ 56-132382

[51] Int. Cl.³ .............................................. D21H 5/12
[52] U.S. Cl. ................... 162/100; 162/145; 162/152; 162/157.2; 162/168.1; 162/168.3; 162/183
[58] Field of Search ............... 162/168.3, 157 C, 183, 162/100, 168.1, 152, 157.2, 145, 181.1; 210/778, 734

[56] References Cited

U.S. PATENT DOCUMENTS

| | | | |
|---|---|---|---|
| 3,770,575 | 11/1973 | Ball | 162/100 |
| 4,229,493 | 10/1980 | Bendiner et al. | 162/5 |
| 4,274,971 | 6/1981 | Hartinger et al. | 210/778 |

FOREIGN PATENT DOCUMENTS

| | | | |
|---|---|---|---|
| 2451799 | 5/1975 | Fed. Rep. of Germany | 210/734 |
| 45-8164 | 3/1970 | Japan . | |
| 48-104945 | 10/1973 | Japan . | |
| 49-46712 | 12/1974 | Japan | 210/734 |
| 52-1728 | 1/1977 | Japan . | |
| 52-5328 | 2/1977 | Japan . | |
| 617998 | 4/1961 | United Kingdom | 162/168.3 |
| 883973 | 12/1961 | United Kingdom | 162/168.3 |
| 2025921 | 1/1980 | United Kingdom | 210/735 |

OTHER PUBLICATIONS

Gupta, M. K., *Tappi*, vol. 63, No. 3, Mar. 1980, pp. 29–31.
Linke, W. C., *Tappi*, vol. 45, No. 4, Apr. 1962, pp. 326–333.

*Primary Examiner*—William F. Smith
*Attorney, Agent, or Firm*—Bacon & Thomas

[57] ABSTRACT

The fibrous material is for the preparation of a sheet material containing large amounts of inorganic fine powders or inorganic short fibers by a usual paper-making method. A raw material for forming the fibrous material is previously impregnated with a polymer flocculant of the polyacrylamide type or the like in the amount of 0.01 to 5% (dry solids). The fibrous material is adaptable for sheets which can be prepared easily by individuals at home as well as at factories. The fibrous material can be utilized for a wide range of application, for example, for various ceramic products, construction materials, papers for special use, filters and so on and for recovery of solids from waste water or the like.

7 Claims, No Drawings

FIBROUS MATERIALS

BACKGROUND OF THE INVENTION

The present invention relates to a fibrous material which can adsorb a large quantity of inorganic fine powders or inorganic short fibers in a paper-making technique. More particularly, the present invention relates to a fibrous material which can effectively produce flocs by mixing the inorganic fine powders or inorganic short fibers with the fibrous material previously dispersed in water and caused to disintegrate, said flocs being capable of being manufactured into paper and adsorbing the inorganic fine powders or inorganic short fibers on the surfaces of the fibrous material, and being employable in producing sheet material containing a large amount of the inorganic fine powders or inorganic short fibers with the fibrous material as a carrier.

Sheet materials containing inorganic fine powders or inorganic short fibers have been employed in a very wide field in which various properties inherent in the inorganic fine powders and the inorganic short fibers are utilized. For instance, sheet materials comprising clay, gypsum, portland cement, asbestos or the like as the inorganic fine powders or inorganic short fibers are employed as construction materials or interior materials such as fire insulation panels, nonflammable panels or the like. In the ceramics industry, the sheet materials are useful for manufacturing numerous ceramic products for use as ceramic wares, electronic devices, magnetic devices or the like, or catalyst supporters for rendering exhaust gases from automobiles nontoxic upon re-combustion, by firing thin sheet materials. In particular, these sheet materials provide ceramic wares in special forms and permit freedom from dust, leading to an improvement in operability and operating environment, by forming cermamic raw powders, glases, pigments or the like into sheets. The sheet materials can also be adapted to special paper, filters or the like, making maximum use of various properties inherent in the inorganic fine powders, such as adsorbability of activated carbon, conductivity of metal powders and so on. Use of the sheet materials for the recovery of sludges and heavy metals from waste water discharged from plants is also important.

It is a general procedure for manufacturing sheet materials containing such inorganic fine powders or inorganic short fibers that the fibrous materials are utilized as carriers for the inorganic fine powders. It is to be noted herein that what is referred to as the inorganic fine powders alone throughout the specification should be understood to include the inorganic short fibers, too, unless otherwise specified. As the sheet materials consisting only of the inorganic fine powders are very difficult to handle and nearly impossible to transport, a variety of procedures have been proposed. Specifically, there are known, for example, the method of coating the sheet material (for example, paper or film) with the inorganic fine powders or impregnating the inorganic fine powders in the sheet material, as described, for example, in Japanese Patent Publication No. 1,728/1977; the method of sheeting coarse flocs manufacturable into paper, said flocs being produced by the addition of chemicals such as a latex, a surface active agent, a flocculant or the like to a slurry of a mixture of the inorganic fine powders with the fibrous material, as described, for example, in Japanese Patent Publication No. 8,164/1970 and No. 5,328/1977; and the method of using cationic pulp as a carrier for the inorganic fine powders because the inorganic fine powders generally have a negative zeta potential in water, as described, for example, in Japanese Laid-Open Patent Application No. 104,945/1974.

There are drawbacks, however, in the method of coating the sheet material with the inorganic fine powders or impregnating the inorganic fine powders in the sheet material, in that it is difficult to increase the amount of the inorganic fine powders to be applied thereon or impregnated therein and distribute the inorganic fine powders homogeneously in the sheet material. The firing of these sheet materials sometimes presented problems in that they were not sintered to a sufficient extent or a deformation would occur during the firing.

The method of adding the chemicals to the slurry of the mixture of the fibrous material with the inorganic fine powders offers advantages in that the amount of the inorganic fine powders in the sheet material can be increased; however, it presents drawbacks in that the preparation, storage and management of the chemicals are laborious, and it is impractical to adapt the preparation of the sheet materials on a small scale for home or individual use because the amount of the chemicals to be added is so extremely small that the procedure for the addition is difficult.

The method of using the cationic pulp can offer advantages in that the step is rendered simple because the cationic pulp itself has the ability to adsorb the inorganic fine powders so that inorganic sheets can be prepared in an simple manner, however, it has drawbacks in that the pulp itself is rendered extremely expensive because numerous chemical treatment procedures are required for cationating the pulp, and there is a limit on the kind of fibrous material capable of being employed for this purpose.

SUMMARY OF THE INVENTION

It is an object of the present invention to provide a fibrous material which can be manufactured at a low cost and which is manufacturable into sheet materials capable of adsorbing large amounts of inorganic fine powders or inorganic short fibers.

Another object of the present invention is to provide a fibrous material which can be prepared by a simplified operation of manufacturing paper so as to permit easy preparation of the sheet material as hereinabove set forth in such a manner as to be adaptable to individual use by persons enjoying ceramic art as a hobby at home, in school or in circles such as "ceramic art clubs", as well as to industrial utilization.

As a result of research carried out in an effort to overcome the drawbacks in the prior art procedures, it has now been found that flocs manufacturable into paper can be efficiently produced merely by mixing the fibrous material with the inorganic fine powders in water, and that the fibrous material itself can be produced cheaply. The present invention has the characteristic feature that the fibrous material is first impregnated with a polymer flocculant.

DETAILED DESCRIPTION OF THE PREFERRED EMBODIMENTS

A description of the present invention will be given in detail.

The present invention is characterized in that the fibrous material is previously impregnated with a polymer flocculant in the amount of 0.01 to 5% dry solids, said fibrous material being employed for the manufacture of sheet materials containing a large quantity of inorganic fine powders or inorganic short fibers by adding the inorganic fine powders or the inorganic short fibers in the amount of 98 to 50% by weight to the fibrous material in the amount of 2 to 50% by weight in a dispersed and disintegrated state in water, and then following a usual paper-making method.

The present invention is based on the fact that the mixing of the inorganic fine powders in a solution of the fibrous material enables the inorganic fine powders to be adsorbed on the surface of the fibrous material because the polymer flocculant previously impregnated in the fibrous material dissolves out in the aqueous solution upon dispersion and disintegration of the fibrous material in water. The phenomenon wherein the inorganic fine powders coagulate in water to become coarse flocs is considered to result from a complicated interaction of a decrease in zeta potential and an increase in hydrophobicity of the inorganic fine powders on the surfaces thereof, and the cross-linking and sticking actions of the polymer flocculant. As a result of extensive review on numerous polymer floculants capable of flocculating the inorganic fine powders adsorbed on the fibrous material surfaces, it has been found that as a polymer flocculant to be impregnated in advance in the fibrous material, there may be employed a synthetic polymer fluocculant such as polyacrylamide, modified polyacrylamide, sodium polyacrylate, acrylamide-sodium acrylate copolymers or the like, having a molecular weight higher than 1,000,000, preferably higher than 3,000,000. In this case, the ionization of the polymer flocculant may be determined by the kind of inorganic fine powders to be adsorbed. Generally, flocculants of anionic type are effective for powders of metal oxides such as alumina, magnesium hydroxide or the like; those of cationic type are effective for sludges or the like; and those of non-ionic and weak alkaline types are effective for inorganic fine powders such as clay, gypsum, pigments or the like.

As the fibrous material into which the polymer fluocculant is to be impregnated, there may be employed cellulose fibers such as natural pulp or the like, synthetic fibers such as synthetic pulp or the like, mineral fibers such as asbestos or the like, and inorganic fibers such as metal, carbon, glass or the like. It is desired that they are easily dispersed in water, and the fiber length is preferably longer than 0.5 mm, more preferably longer than 1.5 mm. The dispersion in water is effective for impregnating the fibrous material with the polymer flocculant and facilitates uniform adsorption of the inorganic fine powders on the surfaces of the fibrous materials. The longer fiber length is extremely effective for the dewatering property upon sheeting, and it improves the strength and handling of the inorganic sheet after sheeting.

Methods of impregnating the surfaces of the fibrous material with the polymer flocculant may include, for example, a method of impregnating by immersion of the fibrous material in a 0.01 to 1% aqueous solution of the polymer flocculant; a method of impregnating by coating the fibrous material with the flocculant by using a sponge roll or the like or by spraying; and a method of impregnating the fibrous material with the polymer flocculant under reduced pressure to thereby force the impregnating solution to penetrate the fibrous material. The fibrous material impregnated with the polymer flocculant may be in a sheet form or in a cottony form; however, the sheet form is advantageous for handling. The amount of polymer flocculant to be used may vary with the kind and amount of the inorganic fine powders to be adsorbed. Where the amount of the polymer flocculant is too small, the effect of adsorbing the inorganic fine powders will become poor; where the amount thereof is too large, the effect of adsorbing the inorganic fine powders will not be enhanced correspondingly, so that such a large amount is meaningless. Accordingly, the amount of the polymer flocculant to be used in impregnating the fibrous material may be in the range of 0.01 to 5% by weight (dry solids), preferably 0.1 to 3% by weight (dry solids) based on the dry weight of the fibrous material.

The fibrous material may be dispersed and disintegrated in water immediately after the impregnation so that the inorganic fine powders are adsorbed on the surfaces of the fibrous material in the aqueous solution. The impregnated material may also be stored and kept in stock for future use. That is, in instances where the fibrous material is transferred to the papermaking step immediately after the impregnation, it is not necessary to take the storage of the fibrous material into consideration. In instances, however, where there is a certain interval between the impregnation step and the paper-making step, it is necessary to store the impregnated fibrous material while maintaining its adsorbing ability. More specifically, where the impregnated fibrous material is stored in a wet state immediately after the impregnation, it may be stored by accommodating it in a bag of a vapor-impermeable film such as polyethylene film or the like. In order not to cause the impregnated fibrous material to deform during long-term storage, however, it is advantageous to store it after it is dried. Furthermore, the dry fibrous material is convenient for handling and transporting. It is necessary to carry out the drying at temperatures below the temperature at which both the fibrous material and the polymer flocculant deform. Thermal deformation of the polymer flocculant may also be referred to as denaturing since the heat alters the molecular structure of the polymer flocculant and thereby modifies some of its original properties. Generally, as the temperature for thermally deforming the polymer flocculant is lower than the temperature for thermally deforming the fibrous material, the drying temperature is dependent upon the temperature for thermally deforming the polymer flocculant. The temperature for thermally deforming the polymer flocculant may vary with the kind of polymer flocculant used. For example, polyacrylamide series polymer flocculants may be dried below about 50° C.

Although the fibrous material may be in a sheet form or in a cottony form prior to the impregnation with the polymer flocculant, it is not readily dispersed and disintegrated in water as it is after the impregnation and drying. As polymer chains of the polymer flocculant may be readily cut by a mechanical shear, and low molecular weight products resulting from the disintegration of the polymer chains cause a decrease in the coagulating and adsorbing effects, it is necessary to disperse and disintegrate the fibrous material in water, for example, with stirring under conditions as mild as possible. To this end, it is effective to adopt a method which involves separating the fibrous material into fibers after the impregnation and the drying. Although it is difficult to handle the fibrous material which is separated into fibers with a rotary crusher or the like after the drying because the fibrous material in the fiber form is rendered bulky or is likely to float or suspend in air, the handling may become easy if the bulky fibrous material is lightly pressed to make it compact. In this case, as the pressing under high pressure into a compact form may render the dispersion and disintegration in water difficult, the pressing pressure may be appropriately in the range of about 5 to 50 kg/cm$^2$. The shape formed by the pressing may be generally in a sheet or in flat panel form, and these shapes are easy to handle. However, the shape may be in a lump form or in any other form, and it is not restricted to any particular one.

In accordance with the present invention, where the inorganic fine powders are adsorbed on the fibrous material to give a uniform sheet of the inorganic fine powders, the amount of the fibrous material to be incorporated in water may not be excessive because it is necessary to disperse the fibrous material homogeneously. If the amount of the fibrous material is excessive, lumps of the fibrous material alone will be produced, and this is not preferred. The use of too much fibrous material also makes it difficult to stir to obtain a uniform dispersion. Specifically, the concentration of the fiborus material in water may be generally in the range of 0.01 to 5%, preferably in the range of 0.1 to 1%. The reason for setting the lower limit is that the amount of the inorganic fine powders to be adsorbed thereon is decreased in proportion to the amount of the fibrous material. Furthermore, the concentration of the polymer flocculant to be added in a state impregnated in the fibrous material is also relevant. That is, in order to recover a large quantity of the inorganic fine powders with the fibrous material in an efficient manner, it is appropriate to contain the polymer flocculant in the amount of 0.5 to 500 p.p.m. with respect to the whole amount of the suspension although it is dependent upon the kind of the inorganic fine powders to be adsorbed. It will be easily understood that, in order to provide such appropriate concentration of the polymer flocculant, the amount of the fibrous material to be incorporated into water must be controlled.

A description will also be given of the inorganic fine powders. The inorganic fine powders to be adsorbed may be small such that they can be sufficiently dispersed in an aqueous solution and may be fine powders having particle sizes that can pass usually through a 200 mesh sieve (Tyler mesh).

The inorganic fine powders may include, for example, almost all natural and artificial inorganic materials including kaolin, alumina, sericite, porcelain clay, Japanese acid clay, pottery stone, feldspar, limestone, gypsum, talc, diatomaceous earth, calcium carbonate, asbestos, mullite, cobalt oxide, manganese dioxide, various glazes, metals, SiC, sludges and so on, and a mixture thereof. A ratio of the fibrous material to the inorganic fine powders is determined depending upon the kinds of the fibrous material and the inorganic fine powders, use of the inorganic fine powder sheet or the paper-making aptitude upon sheeting. In order to have the fibrous material play a role as a carrier for the inorganic fine powders, it is necessary to include the fibrous material in the amount of 2% by weight or larger in the inorganic fine powder sheet. It is appropriate to use the fibrous material in the amount of 50% by weight or lower in order to let the inorganic fine powder sheet best exhibit the inherent characteristics of the inorganic fine powders. Accordingly, it is appropriate to incorporate into water the inorganic fine powders in the amount of 98 to 50% by weight with respect to 2 to 50% by weight of the fibrous material.

In a method of incorporating the inorganic fine powders into water in which the fibrous material is dispersed and disintegrated, the incorporation of the inorganic fine powders in a powdery state may cause the problem in that time required for homogeneously dispersing them is rendered long. It is thus practically applicable to incorporate the inorganic fine powders in a state in which they are milled with water into a slurry in the concentration of 10 to 50%.

As one component of the inorganic fine powders, an inorganic flocculant such as aluminum sulfate, ferric sulfate or the like may be added in a small amount, for example, 0.1 to 5% with respect to the whole amount of the inorganic fine powders. The inorganic flocculant will act on the polymer flocculant contained in the fibrous material in a complex manner to improve synergetically the effect of adsorbing the inorganic fine powders. It is to be noted, however, that there are situations where the addition of the inorganic flocculant does not improve the effect of adsorbing the inorganic fine powders or where some uses do not allow the addition of the inorganic flocculant, so that the inorganic flocculant cannot always be used.

A description will now be given of the preparation of ceramic wares or ceramic bodies by firing green sheets for ceramic wares or ceramics obtainable by the use of the fibrous material of the present invention.

If the fibrous material is obtained from natural pulp or synthetic pulp, these organic materials will be combusted and lost at the early stage of firing under oxidation atmosphere at about 400° to 800° C. so that conditions such as temperature for subsequent sintering may be determined so as to satisfy requirements for each of the inorganic fine powders. Since the sheet material before sintering is in a state which fine powders for sintering are distributed homogeneously at the time of paper making, there are no risks any longer that transformation or cracks may be caused in the sheet material when it is dry-fired. Accordingly, ceramics, tiles and ceramic wares having a large area and a small thickness which are difficult to prepare by conventional methods such as press molding method or milling method can be manufactured in a ready manner.

The green sheet for ceramics prepared from the fibrous material in accordance with the present invention has characteristics that the forming of the green sheet such as folding, bending, cutting, bonding or the like is freely effected because it has a paper-like property in a wet state immediately after the paper-making, so that ceramics having good appearance which could not be accomplished by conventional materials can be manufactured.

In accordance with the present invention, green sheets may be produced by consumers themselves by purchasing the impregnated fibrous material and mixing it with a predetermined inorganic fine powder, so that the consumers can enjoy the manufacture of ceramic wares at school or at home as well as mass production at factories can be carried out.

As has been hereinbefore mentioned, the raw fibrous material in accordance with the present invention can adsorb a large quantity of inorganic fine powders in an extremely easy manner. The present invention also allows consumers to form desired inorganic fine powder sheets by making access to the fibrous material alone, so that it is suitable for the batchwise production of single products by the consumers as well as mass production as factories. The fibrous material of the present invention does not require special chemical treatment such as cationation, so that it is manufactured at less cost.

The fibrous material in accordance with the present invention lends itself to a very wide range of application, for example, for the production of nonflammable paper, adiabatic plates, numerous ceramic products such as a ceramic wares, tiles and so on and for treatments of wastes such as waste water and waste solids.

The present invention will now be described by way of examples of the fibrous materials based on use examples, but it is to be noted that the present invention should not be intended to be restricted thereto.

EXAMPLE 1

A synthetic pulp sheet (trade name, SWP; manufactured by Mitsui Zeraback K.K.) having a thickness of about 3 mm and a weight of 500 g/m$^2$ was subjected to impregnation with a 0.2% aqueous solution of an anionic sodium polyacrylate type polymer flocculant (trade name, A-520; manufactued by Sankyo Kasei Kogyo K.K.) by application with a sponge roll so as to contain the polymer flocculant in the amount of 5 g/m$^2$ (dry solids), that is, in the amount of 1% based on the pulp. After the coated sheet was dried with hot wind at 50° C. for about 5 hours, it was separated into fibers by a rotary crusher, and the separated impregnated synthetic pulp was then pressed under the pressure of about 10 kg/cm$^2$ to provide a sheet material of synthetic pulp impregnated with the polymer flocculant, having a thickness of about 5 mm and a weight of 130 g/m$^2$. The pulp was then dispersed and disintegrated in water to give a pulp solution having the pulp concentration of 1%. To 1,000 parts by weight of the pulp solution were added, with stirring at about 100 r.p.m., 90 parts by weight of alumina fine powder having particle sizes of 3 to 5 μm containing a flux in the amount of 0.4%, whereby the alumina fine powder was adsorbed on the synthetic pulp surfaces. The mixture was then formed into an alumina sheet by the paper-making method using a #60 mesh net. The alumina sheet was then heated by gradually increasing the temperature from room temperature to 1,200° C. over the period of 6 hours and fired at 1,200° C. for 2 hours to give an alumina ceramic having a thickness of 2 mm and sizes of about 30×30 cm.

EXAMPLE 2

A needle bleached kraft pulp sheet having a thickness of 2.5 mm and a weight of 500 g/m$^2$ was subjected to impregnation with a 0.2% aqueous solution of a non-ionic polyacrylamide type polymer flocculant (trade name, N-500; manufactured by Sankyo Kasei Kogyo K.K.) by immersion so as to contain the polymer flocculant in the amount of 5 g/m$^2$ (dry solids). The impregnated pulp sheet was then treated in the same manner as in Example 1 to give a polymer flocculant-impregnated pulp having a thickness of about 10 mm and a weight of 250 g/m$^2$. The impregnated pulp was then dispersed and disintegrated in water to give a pulp solution having the pulp concentration of 0.5%. To 1,000 parts by weight of the pulp solution were added piece by piece with slow stirring, 50 parts by weight of gypsum to which 0.2 part by weight of aluminum sulfate was added, whereby gypsum was adsorbed on the pulp surfaces. After dewatered by the paper-making method, the resultant sheet was cured to give gypsum boards having a thickness of about 7 mm and a weight of about 9 kg/m$^2$.

EXAMPLE 3

A needle unbleached kraft pulp sheet having a thickness of 5 mm and a weight of 250 g/m$^2$ was subjected to impregnation with a 0.4% aqueous solution of a non-ionic polyacrylamide type polymer flocculant (trade name, N-500; Sankyo Kasei Kogyo K.K.) by immersion so as to contain the polymer flocculant in the amount of 10 g/m$^2$. After drying with hot wind at 50° C. for about 6 hours, the sheet was separated into fibers with a crusher and pressed under the pressure of 10 kg/cm$^2$ to give a sheet material of pulps impregnated with the polymer flocculant, having a thickness of about 5 mm and a weight of 130 g/m$^2$. The impregnated pulp was then dispersed and disintegrated in water to give a pulp solution having the pulp concentration of 0.5%. 250 parts by weight of clay slurry for ceramic wares having the concentration of 20% was slowly added piece by piece to 1,000 parts by weight of the pulp solution with slow stirring by hand, whereby the clay was adsorbed on the pulp surfaces to give flocs manufacturable into sheet. The flocs were then sheeted in the same manner as in Example 1 to give green sheets for ceramic wares having a thickness of about 2 mm and a weight of 1.8kg/m$^2$. When the green sheet had the water content of 30%, it was formed into a cylindrical shape. The cylindrical body was then dried, heated to 1,250° C. from room temperature over the period of 8 hours, and then fired at 1,250° C. for 1 hour. The cylindrical body was then spontaneously cooled to give a ceramic ware.

EXAMPLE 4

A carbon fiber (trade name, CF 0808; Nippon Kaynol K.K.) in the amount of 10 parts by weight was impregnated with the polymer flocculant in the same manner as in Example 3 so to contain the polymer flocculant in the amount of 0.1 part by weight (dry solids). The carbon fiber thus impregnated was then dried with hot wind at 50° C. for about 1 hour. The carbon fiber in the amount of 10 parts by weight was then dispersed and stirred with hand in 2,000 parts by weight of water to give a carbon fiber slurry. 450 parts by weight of talc slurry having the concentration of 20% and comprising 0.1 part by weight of aluminum sulfate was slowly added piece by piece to the carbon fiber slurry, whereby talc was adsorbed on the carbon fiber surfaces. The carbon fiber thus prepared was then formed into sheets with a #70 mesh net to give fireproof boards having a thickness of about 5 mm and a weight of about 7 kg/m$^2$.

EXAMPLE 5

A needle unbleached kraft pulp sheet having a thickness of 2.5 mm and a weight of 1,000 g/m$^2$ was applied in a coat with a 0.2% aqueous solution of a non-ionic polyacrylamide with a sponge roll to impregnate the sheet with the polymer flocculant in the amount of 5 g/m$^2$, that is, 0.5% based on the pulp. After dried with hot wind at 50° C. for about 6 hours, the sheet was separated into fibers with a crusher. The pulp was then pressed under the pressure of about 10 kg/cm$^2$ to give an impregnated pulp sheet having a thickness of about 5 mm and a weight of 130 g/m$^2$. The impregnated pulp was then dispersed and disintegrated in water to give a pulp slurry having the pulp concentration of 1%.

While stirring 1,000 parts of the pulp slurry at 100 r.p.m., 600 parts of clay slurry for ceramic wares having the concentration of 30% were slowly added piece by piece, whereby the clay was adsorbed on the pulp surfaces to give flocks manufacturable into sheets. The flocs were sheeted with a wet paper machine having a #60 mesh sheeting net to give a green sheet for ceramic wares having a thickness of about 7 mm and a weight of about 9 kg/m². The sheet was embossed on its one surface with an embossing machine to give a stripe pattern, dried and fired at 1,200° C. to give flat tile ceramics having an uneven pattern.

EXAMPLE 6

A synthetic pulp sheet (trade name, SWP; Mitsui Zeraback K.K.) having a thickness of about 3 mm and a weight of 500 g/m² was coated with a 0.2% aqueous solution of a non-ionic polymer flocculant with a sponge roll so as to impregnate the sheet with the polymer flocculant in the amount of 5 g/m² (dry solids). The sheet was then treated in the same manner as in Example 5 to give a dry impregnated pulp which was in turn formed into a pulp solution having the concentration of 1%. The pulp solution in the amount of 1,000 parts was mixed with 600 parts of clay slurry for ceramic wares having the concentration of 20%, whereby the clay was adsorbed on the surfaces of the pulp. The pulp was sheeted with a #60 mesh net by hand to give a green sheet for ceramic wares having a thickness of about 2 mm and a weight of about 2 kg/m². The sheet was then cut, folded and bonded while in a wet state to give a flower-like form which was in turn dried and fired at 1,150° C. to give a brooch. The resultant brooch was then glazed.

EXAMPLE 7

A needle unbleached kraft pulp sheet having a thickness 1.2 mm and a weight of 1,000 g/m² was coated with a 0.5% aqueous solution of a non-ionic polyacrylamide as a polymer flocculant with a sponge roll so as to impregnate the sheet with the polyacrylamide in the amount of 5 g/m² (dry solids). The sheet was dried with hot wind at 40° C. for 10 minutes to give a pulp sheet containing the polymer flocculant. The pulp sheet was adjusted with water to become a pulp aqueous solution having the concentration of 1% in a pulper and the pulp portion was stirred at 500 r.p.m. for 2 hours to disintegrate the pulp and dissolve the polymer flocculant.

A 50% pottery's clay slurry (pottery's clay containing fine powders of clay, silica, feldspar or the like/-water=1/1, weight ratio) was prepared, and the clay slurry in the amount of 180 parts by weight was slowly mixed and stirred with 1,000 parts by weight of the pulp aqueous solution, whereby the clay was adsorbed on the pulp to form coagulated flocs which in turn were sheeted to give a sheet having a thickness of 7 mm by the usual wet paper-making method. The sheet was embossed with an embossing machine to give a stripe pattern on one side thereof and dried. The dried sheet was heated to 1,200° C. from room temperature over the period of 6 hours and fired at 1,200° C. for 3 hours to give a flat plate ceramic having an uneven pattern.

EXAMPLE 8

A needle unbleached kraft pulp was coated with a 0.2% non-ionic polymer flocculant aqueous solution with a sponge roll to impregnate the pulp with a polyacrylamide flocculant in the amount of 3 g/m² (dry solids) in the same manner as in Example 7.

To the impregnated pulp sheet was added water to become a pulp aqueous solution having the concentration of 2% in a pulper, and the mixture was stirred at 500 r.p.m. to disintegrate the pulp and dissolve the polymer flocculant. A pottery's clay slurry was prepared in the same manner as in Example 7, and the pottery's clay slurry in the amount of 180 parts by weight was mixed with a 20% aqueous solution of aluminum sulfate as an inorganic flocculant in the amount of 10 parts by weight.

The 50% pottery's clay slurry in the amount of 180 parts by weight was slowly mixed and stirred piece by piece with the pulp solution in the amount of 50 parts by weight, whereby the pottery's clay was adsorbed on the pulp to give large-size coagulated flocs. The floc solution was formed by the usual wet paper-making method into a sheet having a thickness of 5 mm which in turn was cut in the wet state to a desired size. The sheet materials were then manually formed into teacups, bowls and accessories which in turn were dried and fired at 1,200° C. in the same manner as in Example 7 to give the ceramics.

EXAMPLE 9

A bleached kraft pulp sheet having a thickness of 1.2 mm and a weight of 1,000 g/m² were immersed in a 0.2% non-ionic polymer flocculant solution to give the impregnated pulp sheet having the dry solids of the polymer flocculant in the amount of 5 g/m². Water was added in a pulper to the impregnated pulp sheet to give a pulp aqueous solution having the concentration of 1%. The pulp aqueous solution was stirred at 600 r.p.m. to disintegrate the pulp and dissolve the polymer flocculant.

The 1% aqueous pulp solution in the amount of 500 parts by weight was mixed slowly and stirred piece by piece with a 50% pottery's clay slurry prepared in the same manner as in Example 7 in the amount of 200 parts by weight, whereby the pottery's clay was adsorbed on the pulp to form coagulated flocs. The flocs were then formed by the wet paper-making method into a sheet having a thickness of 5 mm. After drying, a desired picture was drawn with an inorganic pigment ink in a flat plate state, and the sheet was fired at 1,200° C. in the same manner as in Example 7 to give the ceramic having a picture pattern.

What we claim is:

1. A method of manufacturing a fibrous material containing large amounts of inorganic fine powders or inorganic short fibers comprising impregnating raw fibrous material with a polymer flocculant in the amount ranging from 0.01 to 5%, calculated as dry solids; drying the fibrous material impregnated with the polymer flocculant at a temperature lower than the denaturing temperature of the polymer flocculant; loosening the fibrous material into a bulky fibrous material, press-molding the bulky fibrous material at a pressure of 5 to 50 kg/cm² thereby forming a compact fibrous material; dispersing and disintegrating said compact fibrous material in water such that said impregnated polymer flocculant is released into the water; adding 98% to 50% by weight of the inorganic fine powders or inorganic short fibers to 2 to 50% by weight of said fibrous material to said dispersed and disintegrated fibrous material; and thereafter forming a fibrous material containing large amounts of inorganic powders or inorganic short fibers.

2. The method according to claim 1, wherein the polymer flocculant has a molecular weight of not less than 1,000,000 and is at least one member selected from the group consisting of polyacrylamide, modified polyacrylamide, sodium polyacrylate and acrylamide-sodium acrylate polymer.

3. The method according to claim 1, wherein the polymer flocculant is impregnated in the amount of 0.1 to 3%, calculated as dry solids.

4. The method according to claim 1, wherein the polymer flocculant is polyacrylamide and the drying step is carried out at a temperature of 50° C. or less.

5. The method according to claim 1, wherein the polymer impregnated raw fibrous material is present in an aqueous paper-making method in an amount of from 0.01 to 5%.

6. The method according to claim 5, wherein the suspension used in the paper-making method contains the polymer flocculant in an amount of from 0.5 to 500 p.p.m. with respect to the entire amount of the suspension.

7. The method according to claim 1, wherein the raw fibrous material is cellulose fibers, synthetic fibers, metal fibers or inorganic fibers, said fibers having a fiber length greater than 0.5 mm.

* * * * *